Patented Apr. 6, 1943

2,315,534

UNITED STATES PATENT OFFICE 2,315,534

PREPARATION OF AMMONIUM THIOSULPHATES

Martin Marasco, New Brunswick, N. J., assignor, by mesne assignments, to E. I. du Pont de Nemours & Company, Wilmington, Del., a corporation of Delaware No Drawing. Application April 29, 1941, Serial No. 390,980

13 Claims. (Cl. 260—563)

This invention relates to the preparation of nitrogen containing salts of thiosulphuric acid. More particularly it relates to the preparation of ammonium thiosulphates including unsubstituted and organically substituted thiosulphates. In one of its aspects, it relates to the preparation of unsubstituted ammonium thiosulphates. In another aspect it relates to the preparation of substituted ammonium thiosulphates containing a hydrocarbon radical attached to the nitrogen atom.

This invention has for an object the provision of an improved process of producing an ammonium thiosulphate. A further object is to produce an ammonium thiosulphate in high yields. A still further object is to provide new N-hydrocarbon - substituted ammonium thiosulphates. Another object is to provide a highly concentrated solution of an ammonium thiosulphate. Still other objects will be apparent from the hereinafter described invention.

It has been found that ammonium thiosulphates can be prepared in an economical manner from readily available materials and in high yields by reacting an ammonium mono- or polysulphide with sulphur dioxide in the presence of the ammonium hydroxide corresponding to said sulphide.

While the reaction proceeds fairly well with the ammonium monosulphides, it has been found that greatly improved results can be obtained by using polysulphides of the general formula:

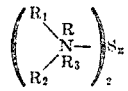

(1)

wherein $x$ is a positive integer greater than 1 and preferably from 2 to 5, R, $R_1$, $R_2$ and $R_3$ constitute a hydrogen atom or a hydrocarbon radical or two or more of the Rs together form a carbocyclic hydrocarbon radical or a heterocyclic hydrocarbon radical with the nitrogen atom. Thus, one or more of R, $R_1$, $R_2$ and $R_3$ may be primary, secondary, tertiary, iso or branched chain alkyl radicals; cycloalkyl, which may contain hydrocarbon and other substituents in the carbocyclic ring; aryl; aralkyl; and R and $R_1$ may form a cycloalkyl radical or aryl radical or a part of a chain which with the nitrogen atom forms a heterocyclic radical.

Suitable alkyl radicals for the values of R, $R_1$, $R_2$ and $R_3$ are methyl, ethyl, propyl, isopropyl, normal, primary, secondary and tertiary-butyl, -pentyl and -hexyl, 2-ethyl hexyl, n-decyl, n-dodecyl, n-tetradecyl, n-octadecyl, etc. Suitable cycloalkyls include cyclopropyl, cyclobutyl, cyclopentyl, cyclohexyl, methylcyclohexyl, dodecylcyclohexyl, chloro-cyclohexyl, etc. Suitable aryls include phenyl, chlorphenyl, tolyl, xylyl, naphthyl, chloronaphthyl, etc., and aralkyls include benzyl, chlorobenzyl, menaphthyl, etc.

In one of its aspects the invention involves the preparation of ammonium thiosulphate by reacting ammonium sulphide or polysulphide, preferably, the latter, with sulphur dioxide in the presence of ammonium hydroxide. The presence of ammonium hydroxide can be attained in various ways, e. g. by dissolving or suspending the ammonium sulphide in an aqueous solution and admixing gaseous ammonia or ammonium hydroxide. The aqueous solution may initially contain ammonium hydroxide and it may be replenished in the manners just described from time to time to insure that there is sufficient base present to prevent the decomposition of the thiosulphate ion formed by the action of $SO_2$ on the ammonium sulphide during the course of the reaction.

In another aspect of the invention a hydrocarbon-substituted ammonium sulphide is reacted with sulphur dioxide in the presence of sufficient hydrocarbon-substituted ammonium hydroxide corresponding to said sulphide to prevent the decomposition of the thiosulphate into free sulphur after the manner described above with ammonium thiosulphate.

The presence of an excess of free base can be accomplished in a number of ways. Sufficient of the particular ammonium hydroxide used may be added at the beginning of the reaction to insure that an excess will still remain after the reaction is completed; a smaller excess may be entered at the beginning of the reaction and steady addition of the particular hydroxide provided concurrently with the addition of sulphur dioxide so that the initial preponderance of said hydroxide is maintained throughout the operation, or the latter operation may be modified so that the pH is maintained above a certain point by periodic additions of calculated quantities of hydroxide throughout the course of the reaction. It is easy to control the addition of the hydroxide, as a heavy precipitation of sulphur results when the concentration drops below the minimum necessary to maintain the correct pH. The addition of sulphur dioxide under pressure is usually arranged to take place at a constant rate and a clear cut end point can be given for the reaction. It is necessary that sufficient $SO_2$ be added to use up practically the entire original charge of polysulphide to insure a fairly pure product. Frequent tests of the solution can be made with lead acetate paper when approximately the calculated amount of $SO_2$ has been added.

The ammonium sulphides and polysulphides used as reactants according to this invention can be made in various manners, e. g. from the corresponding amines or ammonium salts or bases. A practical method for making the polysulphides comprises admixing a sulphide of the general formula:

(2) 

wherein the R's have the same significance as in Formula 1, with sulphur in a quantity which may vary from about 1 to 5 and more mols per mol of the monosulphide, and allowing the reaction to proceed until a clear homogeneous solution or reaction product is obtained. The polysulphide reaction is preferably completed before the reaction with the sulphur dioxide to form an ammonium thiosulphate is carried out.

The process will now be exemplified by reference to the preparation of ammonium thiosulphate. Sulphur is added to ammonium sulphide solution and stirred continually until a clear homogeneous liquid consisting of ammonium polysulphide is obtained. This process may take several hours and is preferably completed before the addition of either ammonium hydroxide or sulphur dioxide. The last mentioned reactants are admixed stepwise. Stirring is continued through the entire course of the process. As the reaction is slightly exothermic, more efficient operation can be attained by carrying out the procedure in a water-cooled vessel or other apparatus which will provide for reasonably steady removal of heat. The pressure of $SO_2$ is maintained at around 50 pounds per square inch during the reaction but may vary over a wide range, e. g. 1 to 50 atmospheres.

It is believed that the reaction takes place substantially as represented in the following example which makes use of ammonium polysulphide:

Higher yields are obtained when sufficient sulphur has been added to the original sulphide solution to give an effective concentration of sulphide in excess of that obtained from the above equation. This excess of sulphur, however, precipitates from solution during the reaction and can be removed from the ammonium thiosulphate solution by filtration. Yields of ammonium thiosulphate have been obtained which are as high as 98% of the theoretical yield as calculated from the equation.

The invention is illustrated but not intended to be limited by the following examples.

EXAMPLE I

*Preparation of ammonium thiosulphate from ammonium polysulphide, ammonium hydroxide and sulphur dioxide*

Ammonium polysulphide was prepared by dissolving 160 grams of sublimed sulphur in one liter of a 20% aqueous ammonium sulphide solution. Two hundred cc. of the solution thus formed were then introduced into a container and mixed with 210 cc. of concentrated ammonium hydroxide solution ($NH_3$ 28%). A stream of sulphur dioxide was introduced into the solution with constant stirring, until a negative test for sulphides was obtained with lead acetate paper. The solution was filtered, analyzed and the yield of ammonium thiosulphate determined. From the procedure described, a yield of 415 cc. of solution analyzing 512 grams of $(NH_4)_2S_2O_3$ per liter was obtained. A small amount of $(NH_4)_2SO_3$ was also formed.

EXAMPLE II

*Preparation of ammonium thiosulphate from ammonium polysulphide, ammonia ($NH_3$) and sulphur dioxide*

Two hundred cc. of ammonium polysulphide solution prepared as described in Example I, which is usually about 20 to 24% concentration, were introduced into a covered container and treated with gaseous ammonia ($NH_3$) and then with sulphur dioxide, the addition of each of these gases being carried out concurrently. Whenever sulphur started to precipitate from the solution, the rate of addition of $NH_3$ was increased and that of $SO_2$ was decreased so that the alkalinity of the solution might be restored. When the endpoint of the reaction had been reached, as evidenced by the failure of the solution to stain lead acetate paper, the addition of gases was discontinued, the resulting solution filtered and then analyzed. From the procedure described, there were obtained 246 cc. of solution which analyzed 715 grams of $(NH_4)_2S_2O_3$ per liter. A small amount of $(NH_4)_2SO_3$ was formed, which can be attributed to the reaction being allowed to run slightly beyond the endpoint.

EXAMPLE III

*Preparation of ammonium thiosulphate on a large scale from ammonium sulphide, sulphur, ammonia ($NH_3$) and sulphur dioxide*

About 50 gallons of 24.2% solution of $(NH_4)_2S$ are introduced into a closed, water-cooled vessel of 100 gallons capacity equipped with means for mechanical stirring, an outlet into a gas trap and two inlets for $SO_2$ and $NH_3$ gases respectively. Into this solution are then poured 63 pounds of powdered sulphur which is mixed into the ammonium sulphide until a clear homogeneous solution is obtained. This process takes at least 2 hours to complete. Ammonia is then let into the solution at a pressure of from 5 to 10 pounds and this is followed by sulphur dioxide at a pressure of about 50 pounds. The rate of addition of the gases is regulated so that there is always a slight excess of ammonia in the solution and consequently an alkaline condition obtains throughout the reaction. In this way 100 pounds of $NH_3$ and 305 pounds of $SO_2$ are added to the container during the course of about 12 hours. As the yellow color of the solution begins to fade near the end of the reaction, periodic tests are made with lead acetate paper until a negative test indicates that the endpoint has been reached. At this point the addition of both gases is discontinued, the solution is filtered and stored as a very concentrated solution of $(NH_4)_2S_2O_3$. If a supersaturated solution is produced, 15 gallons of water may be added to the reaction vessel before filtering to prevent crystallization in the apparatus or in the filter. Calculated on the basis of 96.8 lbs. of $(NH_4)_2S$ obtained from 50 gallons of 24.2% solution, the theoretical yield for the described process is 527 lbs. of $(NH_4)_2SO_3$.

Analysis of a typical run, as described, shows a yield of 85 gallons of concentrated solution containing 726 grams of $(NH_4)_2S_2O_3$ per liter and 7.0 grams of $(NH_4)_2SO_3$ per liter of solution, or a total yield of 515 lbs. of $(NH_4)_2S_2O_3$. In this case, the process gives a yield of almost 98% of the theoretical.

A suitable photographic fixing bath can be prepared by adding directly to the 85 gallons of ammonium thiosulfate solution 75 gallons of water, 22.3 pounds of anhydrous sodium sulphite, 34.3 lbs. of sodium acetate $(NaOOCCH_3 \cdot 3H_2O)$, 51.5 lbs. of potassium alum, and 13.7 lbs. of citric acid. When the added chemicals have been completely dissolved, sufficient water is then added to make the final volume of the solution 205.7 gallons.

EXAMPLE IV

*Preparation of triethanolamine thiosulphite from triethanolamine, hydrogen sulphide, sulphur and sulphur dioxide*

Two hundred grams of triethanolamine,

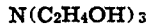
$N(C_2H_4OH)_3$ were dissolved in 200 grams of water and the resulting solution saturated with hydrogen sulphide. The process required 45.6 grams of $H_2S$. To this solution of triethanolamine sulphide, were added 30 grams of sulphur with constant stirring to form a clear, homogeneous solution of triethanolamine polysulphide. Sulphur dioxide was then passed into this solution until a slight precipitate of sulphur was formed and then more triethanolamine was added until the solution cleared. Alternate additions of $SO_2$ and

$N(C_2H_4OH)_3$ were continued after this fashion until a negative test with lead acetate paper indicated that sulphides were absent from the solution. Addition of the chemicals was then stopped and the solution filtered to obtain a clear, amber solution of triethanolamine thiosulphate.

EXAMPLE V

*Preparation of cyclohexylamine thiosulphate from cyclohexylamine, hydrogen sulphide, sulphur and sulphur dioxide*

Two hundred cc. of cyclohexylamine were dissolved in 1300 cc. of water and the solution saturated with hydrogen sulphide. Forty grams of powdered sulphur were then added to the solution with vigorous stirring and the mixture stirred until the sulphur was entirely dissolved. Sulphur dioxide was then passed into the solution which consisted essentially of cyclohexylamine polysulphide until a slight cloudiness indicated the precipitation of sulphur. At this point, more cyclohexylamine was added to increase the pH beyond the point necessary to prevent precipitation, and alternate additions of cyclohexylamine and sulphur dioxide were continued until a negative test with lead acetate paper showed the absence of sulphides. In all, 300 cc. of cyclohexylamine enter into the reaction. The resulting solution was then filtered and crystals of cyclohexylamine thiosulphate (which is a new compound) obtained by chilling. The compound has the general formula:

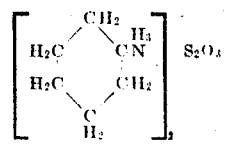

During the process it may be necessary to add portions of water to prevent premature crystallization of the thiosulphate. The reaction just described yielded 307 grams of practically pure cyclohexylamine thiosulphate. Based on cyclohexylamine, the yield is 75% of the theoretical.

EXAMPLE VI

*Preparation of hexamethylenediamine thiosulphate from hexamethylenediamine, hydrogen sulphide, sulphur and sulphur dioxide*

A 400 cc. portion of a 47.5% solution of hexamethylenediamine in methanol was mixed with an equal volume of water and the resulting solution saturated with hydrogen sulphide gas. An additional 200 cc. of hexamethylenediamine was added to the solution after treatment with hydrogen sulphide, and this was followed by the addition of 30 g. of powdered sulphur. This mixture was stirred mechanically until the sulphur had entirely dissolved. The resulting solution was then treated with sulphur dioxide gas until a negative test for sulphides was obtained with lead acetate paper. The solution was filtered and crystals of hexamethylenediamine thiosulphate obtained by evaporation on the steam bath. The procedure produced 327 g. of salt which analysis showed to contain only 3.91 g. of hexamethylenediamine sulphite. The actual yield is practically 323 g. of pure hexamethylenediamine thiosulphate. The theoretical yield calculated on the basis of 285 g. of hexamethylenediamine used is 464 g. The percentage yield of hexamethylenediamine thiosulphate is 69.6%. In this particular example, the yield was decreased considerably by an error in operation whereby a rather large excess of sulphur dioxide was added after the endpoint had been reached.

In place of the specific sulphides set forth in the above examples can be substituted any ammonium sulphide having the constitution and/or structure above described. Suitable additional sulphides include monomethylamine polysulphide, diethylamine polysulphide, triethylamine polysulphide, tetramethylammonium polysulphide and the corresponding ethyl polysulphides, monoethanolamine polysulphide, diethanolamine polysulphide, phenyl trimethylammonium polysulphide, benzyltrimethylammonium polysulphide, benzylamine polysulphide, piperidine polysulphide, etc., and the corresponding monosulphides, which can be made in the same manner as described in the above examples.

Suitable additional bases which can be used for the preparation of thiosulphates in place of those set forth in the examples include:

Aliphatic

Methyl ammonium hydroxide
Ethyl ammonium hydroxide
Dimethyl ammonium hydroxide
Diethyl ammonium hydroxide
Tri and tetramethyl ammonium hydroxides
Tri and tetraethyl ammonium hydroxides
Trimethyl methylolammonium hydroxide
Trimethyl methoxy methyl ammonium hydroxide
Trimethyl bromomethyl ammonium hydroxide
Trimethyl-(alpha, beta dibromoethyl) ammonium hydroxide
Trimethyl-(alpha-brom-$\beta$:$\beta$-dimethyl vinyl) ammonium hydroxide

Alicyclic

Cyclobutylammonium hydroxide
Cyclopentylammonium hydroxide
Dimethylcyclobutylammonium hydroxide
Trimethylcyclobutylammonium hydroxide
Methylcyclohexylammonium hydroxide
Dimethylcyclohexylammonium hydroxide
Trimethylcyclohexylammonium hydroxide
Mono- and diethylcyclohexylammonium hydroxides
Dicyclohexylammonium hydroxide
Trimethylcycloheptylammonium hydroxide

Aromatic-aliphatic

Dimethylphenylammonium hydroxide
Dimethylethylphenylammonium hydroxide
Methyldiethylphenylammonium hydroxide
Triethylphenylammonium hydroxide
Dimethylpropylammonium hydroxide
Dimethylisobutylphenylammonium hydroxide
Methylethylisoamylphenylammonium hydroxide
Trimethyl-p-tolyl-ammonium hydroxide
Methylphenyldibenzylammonium hydroxide
Trimethyl-alpha-naphthyl-ammonium hydroxide
Triethyl-alpha-naphthyl-ammonium hydroxide

Heterocyclic

N-methyl-pyridinium hydroxide
N-ethyl-pyridinium hydroxide
N-$\beta$-iodoethyl-pyridinium hydroxide
N-phenyl pyridinium hydroxide
N-o-tolyl pyridinium hydroxide
N-(alpha-p-tolyl-ethyl) pyridinium hydroxide
N-cinnamyl pyridinium hydroxide
N-alpha-naphthyl pyridinium hydroxide
N:N-dimethyl isoindolinium hydroxide
N-methyl-N-benzyl piperidinium hydroxide
N-methyl-N-benzylpyrrolidinium hydroxide
N:N-diethylpiperidinium hydroxide The products of this invention are useful in photography, especially in the preparation of photographic fixing baths, particularly concentrated fixing baths. They are compatible with common constituents of fixing compositions, e. g. sodium sulphite, acetic acid, boric acid, potassium alum, propionic acid, sodium acetate, boron triacetate, citric acid, sodium acid phosphate, sodium gluconate, sulphamic acid, sodium citrate, chrome alum, borax, sodium metaborate, aluminum chloride, sulphuric acid.

The substituted and unsubstituted ammonium thiosulphates can be used in the cleaning of silverware as a solvent for silver sulphide. The products can also be used as antichlors to destroy free chlorine, in the extraction of silver from certain ores, in textile treating baths and as mild reducing agents. The organic thiosulphates which can be prepared by this process have value as chemical intermediates, pharmaceuticals and intermediates.

The hydroxides just described may be used with the corresponding polysulphides, the preparation of which has been described above. However, it is not always essential that the hydroxide correspond with the sulphide used, but desirable if pure products are to be obtained. Mixtures of thiosulphates have utility in photographic compositions. For instance, ammonium hydroxide can be used as the sole base with any organic polysulphide or may replace a part of the hydroxide.

One of the most important advantages of this invention is that it permits the preparation of a large number of ammonium thiosulphates which were heretofore unknown. A further advantage is the high yields possible with this process, which amount to 95-98% of the theoretical. A still further advantage is that the process permits the preparation of a large number of amine-thiosulphates without the necessity of removing unwanted products of reaction by recrystallization. A still further advantage is that it permits the preparation of a highly concentrated solution of thiosulphate, for use as a concentrated fixing bath in photography, by direct chemical reaction without the necessity of concentration of more dilute solutions by evaporation.

Another advantage resides in the fact that it enables one to produce high yields of ammonium thiosulphates from available and economical reactants by a few simple procedural steps. Another advantage resides in the fact that the processes can be carried out in simple and economical equipment.

As many apparently widely different embodiments of this invention may be made without departing from the spirit and scope thereof, it is to be understood that the invention is not to be limited except as defined by the appended claims.

I claim:

1. The process which comprises reacting an ammonium sulphide with sulphur dioxide, in aqueous solution in the presence of an excess of an ammonium hydroxide.

2. The process which comprises reacting an ammonium sulphide with sulphur dioxide in aqueous solution in the presence of a sufficient amount of the corresponding ammonium hydroxide to prevent the decomposition of the resulting thiosulphate ion during the course of the reaction.

3. The process which comprises reacting an ammonium polysulphide with sulphur dioxide in aqueous solution in the presence of an excess of ammonium hydroxide.

4. The process which comprises reacting an ammonium polysulphide with sulphur dioxide in aqueous solution in the presence of a sufficient amount of the corresponding ammonium hydroxide to prevent the decomposition of the resulting thiosulphate ion during the course of the reaction.

5. The process which comprises reacting an ammonium sulphide having at least one hydrocarbon radical attached to the nitrogen atom with sulphur dioxide in aqueous solution in the presence of the corresponding ammonium hydroxide.

6. The process which comprises reacting an ammonium polysulphide having at least one hydrocarbon radical attached to the nitrogen atom with sulphur dioxide in aqueous solution in the presence of a sufficient amount of the corresponding ammonium hydroxide to prevent the decomposition of the resulting thiosulphate ion during the course of the reaction.

7. The process which comprises reacting an ammonium monosulphide with sulphur and reacting the ammonium polysulphide formed with sulphur dioxide in aqueous solution in the presence of an excess of ammonium hydroxide.

8. The process which comprises reacting an ammonium monosulphide having at least one hydrocarbon radical attached to the nitrogen atom with sulphur and reacting the ammonium polysulphide formed with sulphur dioxide in aqueous solution in the presence of an excess of the corresponding ammonium hydroxide.

9. As new compounds the cycloalkylamine thiosulphates.

10. As new compounds the cyclohexylamine thiosulphates.

11. The process which comprises reacting an ammonium polysulphide with sulphur dioxide in aqueous solution while maintaining a sufficient amount of the corresponding hydroxide present so that the precipitation of sulphur is substantially avoided during the course of the reaction.

12. The process which comprises reacting an unsubstituted ammonium polysulphide with sulphur dioxide in an aqueous solution in the presence of a sufficient amount of ammonium hydroxide to prevent decomposition of the resulting thiosulphate ion during the course of the reaction.

13. The process which comprises reacting cyclohexylamine polysulphide with sulphur dioxide in an aqueous solution in the presence of a sufficient quantity of cyclohexylamine to prevent the decomposition of the resulting thiosulphate ion during the course of the reaction and recovering cyclohexylamine thiosulphate by crystallizing it from the solution and removing the crystals.

MARTIN MARASCO.